United States Patent
Kalkanoglu et al.

(10) Patent No.: US 8,491,985 B2
(45) Date of Patent: Jul. 23, 2013

(54) COATING COMPOSITIONS FOR ROOFING GRANULES, DARK COLORED ROOFING GRANULES WITH INCREASED SOLAR HEAT REFLECTANCE, SOLAR HEAT-REFLECTIVE SHINGLES, AND PROCESS FOR PRODUCING THE SAME

(75) Inventors: Husnu M. Kalkanoglu, Swarthmore, PA (US); Thomas McShea, Wareham, MA (US); Ming Liang Shiao, Collegeville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 242 days.

(21) Appl. No.: 12/933,144

(22) PCT Filed: Mar. 18, 2009

(86) PCT No.: PCT/US2009/037467
§ 371 (c)(1),
(2), (4) Date: Sep. 17, 2010

(87) PCT Pub. No.: WO2009/145968
PCT Pub. Date: Dec. 3, 2009

(65) Prior Publication Data
US 2011/0008622 A1    Jan. 13, 2011

Related U.S. Application Data

(60) Provisional application No. 61/040,983, filed on Mar. 31, 2008.

(51) Int. Cl.
*B32B 5/16*      (2006.01)
*B32B 5/22*      (2006.01)
*B32B 5/30*      (2006.01)
*B32B 18/00*    (2006.01)
*D06N 7/04*     (2006.01)

(52) U.S. Cl.
USPC ........... 428/143; 428/148; 428/149; 428/331; 428/325; 428/403; 428/404; 428/409

(58) Field of Classification Search
IPC ........ B32B 5/16, 5/22, 5/30, 18/00; D06N 7/04
See application file for complete search history.

(56) References Cited

U.S. PATENT DOCUMENTS

| | | | |
|---|---|---|---|
| 2,379,358 A | | 6/1945 | Jewett |
| 2,417,058 A | * | 3/1947 | Buzzell et al. ................ 428/145 |

(Continued)

FOREIGN PATENT DOCUMENTS

| | | |
|---|---|---|
| EP | 0003302 A | 8/1997 |
| GB | 1214816 A | 2/1970 |

(Continued)

OTHER PUBLICATIONS

Levinson et al., Methods of creating solar-reflective nonwhite surfaces and their application to residential roofing materials, Solar Energy Materials & Solar Cells (2006), DOI: 10.1016/j.solmat.2006.06.062.*

(Continued)

*Primary Examiner* — Hoa (Holly) Le
(74) *Attorney, Agent, or Firm* — Paul & Paul (57) ABSTRACT

Dark colored roofing granules include an inert base particle coated with a composition including a metal silicate, a non-clay latent heat reactant, and a dark colored but solar reflective pigment.

16 Claims, 1 Drawing Sheet

U.S. PATENT DOCUMENTS

| | | |
|---|---|---|
| 2,591,149 A | 4/1952 | Grove |
| 2,614,051 A | 10/1952 | Buzzell et al. |
| 2,732,311 A | 1/1956 | Hartwright |
| 2,898,232 A | 8/1959 | Miller et al. |
| 2,927,045 A | 3/1960 | Lodge et al. |
| 2,963,378 A | 12/1960 | Palmquist et al. |
| 2,981,636 A | 4/1961 | Lodge et al. |
| 3,255,031 A | 6/1966 | Lodge et al. |
| 3,507,676 A | 4/1970 | McMahon |
| 3,998,644 A | 12/1976 | Lodge |
| 4,038,239 A | 7/1977 | Coyner et al. |
| 4,092,441 A | 5/1978 | Meyer et al. |
| 4,218,502 A | 8/1980 | Graham et al. |
| 4,287,248 A | 9/1981 | Gessner et al. |
| 4,312,673 A | 1/1982 | Neely, Jr. |
| 4,378,408 A | 3/1983 | Joedicke |
| 4,583,486 A | 4/1986 | Miller |
| 4,708,812 A | 11/1987 | Hatfeld |
| 4,717,614 A | 1/1988 | Bondock et al. |
| 4,916,014 A | 4/1990 | Weber et al. |
| 5,000,999 A | 3/1991 | Hollander |
| 5,194,113 A | 3/1993 | Lasch et al. |
| 5,240,760 A | 8/1993 | George et al. |
| 5,310,803 A | 5/1994 | Hansen |
| 5,356,664 A | 10/1994 | Narayan et al. |
| 5,380,552 A | 1/1995 | George et al. |
| 5,411,803 A | 5/1995 | George et al. |
| 5,427,793 A | 6/1995 | Bigham et al. |
| 5,456,785 A | 10/1995 | Venable |
| 5,466,280 A | 11/1995 | Lee et al. |
| 5,484,477 A | 1/1996 | George et al. |
| 5,514,350 A | 5/1996 | Kear et al. |
| 5,516,573 A | 5/1996 | George et al. |
| 5,541,350 A | 7/1996 | Murata et al. |
| 5,571,596 A | 11/1996 | Johnson |
| 5,573,782 A | 11/1996 | Bigham et al. |
| 5,595,813 A | 1/1997 | Ogawa et al. |
| 5,620,554 A | 4/1997 | Venable |
| 5,643,399 A | 7/1997 | Venable |
| 5,723,516 A | 3/1998 | Bigham et al. |
| 5,731,369 A | 3/1998 | Mahoney |
| 5,770,295 A | 6/1998 | Alderman |
| 5,783,506 A | 7/1998 | Eppler et al. |
| 5,795,389 A | 8/1998 | Koschitzky |
| 5,840,111 A | 11/1998 | Wiederhoft et al. |
| 5,876,683 A | 3/1999 | Glumac et al. |
| 5,928,761 A | 7/1999 | Hedblom et al. |
| 5,962,143 A | 10/1999 | Krauthauser et al. |
| 6,037,289 A | 3/2000 | Chopin et al. |
| 6,063,312 A | 5/2000 | Mannheimer |
| 6,124,466 A | 9/2000 | Matsuno et al. |
| 6,143,318 A | 11/2000 | Gilchrist et al. |
| 6,156,245 A | 12/2000 | Takebayashi et al. |
| 6,174,360 B1 | 1/2001 | Sliwinski et al. |
| 6,214,466 B1 | 4/2001 | Joedicke |
| 6,217,252 B1 | 4/2001 | Tolliver et al. |
| 6,245,381 B1 | 6/2001 | Israel |
| 6,245,850 B1 | 6/2001 | Fields |
| 6,296,912 B1 | 10/2001 | Zickell |
| 6,355,309 B1 | 3/2002 | Fleming et al. |
| 6,362,121 B1 | 3/2002 | Chopin et al. |
| 6,366,397 B1 | 4/2002 | Genjima et al. |
| 6,376,075 B1 | 4/2002 | Tacke-Willemsen et al. |
| 6,426,309 B1 | 7/2002 | Miller et al. |
| 6,446,402 B1 | 9/2002 | Byker et al. |
| 6,451,874 B1 | 9/2002 | Purgett et al. |
| 6,454,848 B2 | 9/2002 | Sliwinski et al. |
| 6,465,088 B1 | 10/2002 | Talpaert et al. |
| 6,500,555 B1 | 12/2002 | Khaldi |
| 6,502,360 B2 | 1/2003 | Carr, III et al. |
| 6,521,038 B2 | 2/2003 | Yanagimoto et al. |
| 6,531,200 B2 | 3/2003 | Zickell et al. |
| 6,533,961 B2 | 3/2003 | Harelstad et al. |
| 6,537,703 B2 | 3/2003 | DuPasquier et al. |
| 6,548,145 B2 | 4/2003 | Joedicke |
| 6,569,520 B1 | 5/2003 | Jacobs |
| 6,572,784 B1 | 6/2003 | Coombs et al. |
| 6,596,070 B1 | 7/2003 | Schmidt et al. |
| 6,599,355 B1 | 7/2003 | Schmidt et al. |
| 6,607,781 B2 | 8/2003 | Joedicke |
| 6,610,135 B1 | 8/2003 | Ohmori et al. |
| 6,610,147 B2 | 8/2003 | Aschenbeck |
| 6,647,688 B1 | 11/2003 | Gaitan et al. |
| 6,653,356 B2 | 11/2003 | Sherman |
| 6,680,134 B2 | 1/2004 | Maurer et al. |
| 6,692,824 B2 | 2/2004 | Benz et al. |
| 6,703,127 B2 | 3/2004 | Davis et al. |
| 6,797,277 B2 | 9/2004 | Heier et al. |
| 6,861,145 B2 | 3/2005 | Nastke et al. |
| 6,881,702 B2 | 4/2005 | Arnold et al. |
| 6,905,698 B1 | 6/2005 | Aldcroft et al. |
| 6,933,007 B2 | 8/2005 | Fensel et al. |
| 7,066,998 B2 | 6/2006 | Rohrbaugh et al. |
| 7,132,143 B2 | 11/2006 | Zanchetta et al. |
| 7,176,245 B2 | 2/2007 | Stucky et al. |
| 7,238,408 B2 | 7/2007 | Aschenbeck et al. |
| 8,034,432 B2 * | 10/2011 | Joedicke ..................... 428/145 |
| 8,114,516 B2 * | 2/2012 | Shiao et al. .................. 428/402 |
| 2002/0092596 A1 | 7/2002 | Phillips et al. |
| 2002/0160151 A1 | 10/2002 | Pinault et al. |
| 2003/0035972 A1 | 2/2003 | Hanson et al. |
| 2003/0044525 A1 | 3/2003 | Aschenbeck |
| 2003/0068469 A1 | 4/2003 | Aschenbeck et al. |
| 2003/0091795 A1 | 5/2003 | Kiik et al. |
| 2003/0091814 A1 | 5/2003 | Benz et al. |
| 2003/0152747 A1 | 8/2003 | Fensel et al. |
| 2003/0203145 A1 | 10/2003 | Zanchetta et al. |
| 2003/0219563 A1 | 11/2003 | Zanchetta et al. |
| 2004/0076826 A1 | 4/2004 | Lee |
| 2004/0110639 A1 | 6/2004 | Joedicke |
| 2004/0170806 A1 | 9/2004 | Hittle et al. |
| 2004/0255548 A1 | 12/2004 | Hong et al. |
| 2004/0258835 A1 | 12/2004 | Hong et al. |
| 2005/0053745 A1 | 3/2005 | Bartek et al. |
| 2005/0053746 A1 | 3/2005 | Bartek |
| 2005/0064175 A1 | 3/2005 | Azari et al. |
| 2005/0072110 A1 | 4/2005 | Shiao et al. |
| 2005/0072114 A1 | 4/2005 | Shiao et al. |
| 2005/0074580 A1 * | 4/2005 | Gross et al. ................. 428/143 |
| 2006/0110996 A1 | 5/2006 | Getlichermann |
| 2006/0243388 A1 | 11/2006 | Kubiak et al. |
| 2006/0251807 A1 | 11/2006 | Hong et al. |

FOREIGN PATENT DOCUMENTS

| | | | |
|---|---|---|---|
| JP | | 61176501 A | 8/1986 |
| JP | | 2004162482 | 6/2004 |
| WO | | 9423580 A | 10/1994 |
| WO | | 0011949 A | 3/2000 |

OTHER PUBLICATIONS

Adobe Systems Inc., Technical Guides "Color Models, CIELAB" 2 pgs., 2000.
Adobe Systems Inc., Technical Guides "Color Models, The CIE Color Models," 2 pgs., 2000.
Adobe Systems Inc., Technical Guides "Color Models, CIEXYZ," 2 pgs., 2000.
Adobe Systems Inc., Technical Guides "Color Models, The Munsell Color System", 4 pgs., 2000.
BASF Aktiengesellschaft, "Product Specification, SIXOLUX Metal Gloss L 6015," 1 pg., Sep. 18, 2002.
BASF Akitengessellschaft, "Product Specification, SIXOLUX Copper Gloss L 3015," 1 pg., Sep. 18, 2002.
BASF Corporation, "BASF launches two new pigments for tile coatings" by BASF Corp., 1 pg., 1998-2003.
Ferro Corporation, "Cool Colors & Eclipse Heat and Energy Saving Pigments," 2 pgs., 1999-2003.
Ferro Corporation, "How Cool Colors & Eclipse Work," 2 pgs., 2003.
Gifty Osel-Prempel, et al., "Synthesis and Application of Fluorocarbon Functionalized Mesoporous Silica" Materkals Engineering and Sciences Division # 574, 2006.
H. Akabari, "Cool Colored Materials for Roofs," Lawrence Radiation Laboratory, presented at Emerging Technologies in Energy Efficiency-Summer 2004, San Francisco, Oct. 14, 2004.
L. Sung, et al., "Characterization of Coating microstructure Using Laser Scanning Confocal Microscopy," Polymer Materials, Science and Engineering, 83, 242-344, 2000.

Ming-Zhi, et al., "A novel fabrication of meso-porous silica film by sol-gel of TEOS," Journal of Zhejiang University Science, 442-427, 2004.

Project Advisory Committee Meeting, "Development of Cool Colored Roofing Materials," Oak Ridge National Laboratory and Livermore Berkeley National Laboratory, 55 pgs., Mar. 11, 2003.

Qingyuan Hu, "Synthesis and Characterization of Functionalized Mesoporous Silica by Aerosol-Assisted Self-Assembly," Chemical & Biomolecular Engineering, # 574 2006.

Rhonda Stroud "Silica Sol as Nanoglue," Naval Research Laboratory, American Physical Society, Mar. 2000.

Silberline Manufacturing Co., Inc., "StarBrite," 1 pg., 2003.

T. A. Germer, et al., "Modeling the appearance of special effect pigment coatings," Surface Scattering and Diffraction for Advance Metrology, Proc., SPIE 4447, 77-96, 2001.

Y. Jiang, et al., "Novel Pigment Approaches in Optically Variable Security Inks Including Polarizing Cholesteric Liquid Crystal (CLC) Polymers," Optical Security and Counterfeit Deterrence Techniques IV, SPIE 4677, 2000.

* cited by examiner

COATING COMPOSITIONS FOR ROOFING GRANULES, DARK COLORED ROOFING GRANULES WITH INCREASED SOLAR HEAT REFLECTANCE, SOLAR HEAT-REFLECTIVE SHINGLES, AND PROCESS FOR PRODUCING THE SAME

CROSS-REFERENCE TO RELATED APPLICATIONS

This is a national stage 371 application of International Application No. PCT/US09/37467, filed Mar. 18, 2009, which claims the benefit of Provisional Patent Application No. 61/040,983, filed Mar. 31, 2008.

BACKGROUND OF THE INVENTION

1. Field of the Invention

The present invention relates to protective granules for asphalt roofing shingles, coating compositions for preparing roofing granules, roofing granules, roofing shingles employing such granules, and processes for makings such granules and shingles.

2. Brief Description of the Prior Art

Pigment-coated mineral rocks are commonly used as color granules in roofing applications to provide aesthetic as well as protective functions to the asphalt shingles. Roofing granules are generally used in asphalt shingles or in roofing membranes to protect asphalt from harmful ultraviolet radiation.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. For example, U.S. Pat. No. 1,898,345 to Deming discloses coating a granular material with a coating composition including a sodium silicate, a coloring pigment, and a colloidal clay, and heating below the fusing temperature of sodium silicate, and subsequently treating with a solution, such as a solution of calcium or magnesium chloride, or aluminum sulphate, that will react with the sodium silicate to form an insoluble compound. Similarly, U.S. Pat. No. 2,378,927 to Jewett discloses a coating composition for roofing granules consisting of sodium silicate, and clay or another aluminum-bearing compound such as sodium aluminate, or cryolite or other insoluble fluorides such as sodium silicofluoride, and a color pigment. The coating is then heat cured at a temperature above the dehydration temperature of the coating materials but below the fusion temperature at which the combination of materials fuses, thus producing a non-porous, insoluble weather-resistant cement. Preparation of colored, coated roofing granules is also disclosed for example, in U.S. Pat. No. 2,981,636 of Lodge et al. The granules are employed to provide a protective layer on asphaltic roofing materials such as shingles, and to add aesthetic values to a roof.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Mineral surfaced asphalt shingles, such as those described in ASTM D225 or D3462, are generally used in steep-sloped roofs to provide water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called heat-island effects and increase the cooling load to its surroundings. It is therefore advantageous to have roofing shingles that have high solar reflectivity in order to reduce the solar heat absorption.

The surface reflectivity of an asphalt shingle largely depends on the solar reflectance of the granules that are used to cover the bitumen. Roofing granules are typically produced by pigmenting inert mineral particles with metal-silicate binders and clays as a latent heat reactant at an elevated temperature, for example, such as those described in U.S. Pat. No. 2,981,636.

In order to reduce the solar heat absorption, one may use light colored roofing granules which are inherently more reflective towards the solar radiation. White pigment containing latex coatings have been proposed and evaluated by various manufacturers. However, consumers and homeowners often prefer darker or earth tone colors for their roof. In recent years, there have been commercially available roofing granules that feature a reflective base coat (i.e., a white coat) and a partially coated top color coat allowing the reflective base coat to be partially revealed to increase solar reflectance. Unfortunately, these granules have a "washed-out" color appearance due to the partially revealed white base coat.

Other manufactures have also proposed the use of exterior-grade coatings that were colored by infrared-reflective pigments for deep-tone colors and sprayed onto the roof in the field. U.S. Patent Application Publication No. 2003/0068469 A1 discloses an asphalt-based roofing material comprising mat saturated with an asphalt coating and a top coating having a top surface layer that has a solar reflectance of at least 70%. U.S. Patent Application Publication No. 2003/0152747 A1 discloses the use of granules with solar reflectance greater than 55% and hardness greater than 4 on the Moh's scale to enhance the solar reflectivity of asphalt based roofing products. However, there is no control of color blends and the novel granules are typically available only in white or buff colors. U.S. Patent Application Publication No. 2005/0074580 A1 discloses a non-white construction surface comprising a first reflective coating and a second reflective coating with total direct solar reflectance of at least 20%.

Also, there have been attempts in using special near-infrared reflective pigments in earth-tone colors to color roofing granules for increased solar reflectance. However, the addition of kaolin clays, which are used to make the metal-silicate binder durable through heat curing, inevitably reduce the color strength or the color intensity of the pigment. As a result, dark-colored or black granules (L* less than 30) that have good solar reflectance (greater than 20 percent) cannot be produced using conventional roofing granule manufacturing processes with clay as a latent reactant.

Colored roofing granules can also be prepared using a metal silicate binder without adding clay and curing the binder at temperatures greater than glass sintering temperature, or through a "pickling" process by applying acid. However, these alternatives require either very high temperatures, or the use of corrosive chemicals, and in many cases could result in loss of color due to pigment degradation by the acid. In the alternative, a non-silicate binder, such as a synthetic polymeric binder, can be used to coat the inert mineral materials in order to produce roofing granules with dark colors and high solar reflectance. However, the long-term durability and cost for polymeric coatings are not as advantageous as the silicate binders.

Therefore, it would be advantageous to have a method of producing dark-colored roofing granules with high solar reflectance using a metal-silicate binder.

There is a continuing need for roofing materials, and especially asphalt shingles, that have improved resistance to thermal stresses while providing an attractive appearance. In particular, there is a need for roofing granules that provide increased solar heat reflectance to reduce the solar absorption of the shingle, while providing a wide range of colors including deep-tone colors to maintain the aesthetic value of the system.

SUMMARY OF THE INVENTION

The present invention provides a coating composition for preparing roofing granules, roofing granules that provide increased solar heat reflectance, while providing deep-tone colors, as well as a process for preparing such roofing granules, and asphalt shingle roofing products incorporating such roofing granules.

In one aspect, the present invention provides a coating composition for preparing roofing granules. The coating composition comprises a metal silicate, at least one non-clay latent heat reactant, at least one solar heat-reflective pigment; and optionally, at least one colorant. Preferably, the at least one non-clay latent heat reactant is selected from the group consisting of Portland cement, aluminum fluoride, ammonium silicofluoride, alkali metal silicofluorides, and alkaline earth metal silicofluorides. More preferably, the at least one non-clay latent heat reactant comprises Portland cement, aluminum fluoride and at least one alkali metal silicofluoride. Preferably, the at least one alkali metal silicofluoride is sodium silicofluoride. Preferably, the at least one non-clay latent heat reactant comprise from about 3 to 15 weight percent of the coating composition of aluminum fluoride, from about 0.5 to 5 weight percent of the coating composition of sodium silicofluoride, and from about 0.5 to 5 weight percent of the coating composition of Portland cement. More preferably, the at least one non-clay latent heat reactant comprise from about 5 to 11 weight percent of the coating composition of aluminum fluoride, from about 1.5 to 3 weight percent of the coating composition of sodium silicofluoride, and from about 1.5 to 3 weight percent of the coating composition of Portland cement. Preferably, the metal silicate is selected from the group consisting of ammonium silicate, sodium silicate, potassium silicate and lithium silicate. Preferably, the at least one solar heat-reflective pigment is selected from the group consisting of solar reflective pigments having an L* less than 30 and a solar reflectance greater than 20 percent.

In another aspect, the present invention provides dark colored, solar-heat reflective roofing granules. The roofing granules according to the present invention comprise an inert base particle and at least one coating layer. The at least one coating layer is formed from a silicate coating composition comprising a metal silicate coating binder comprising a metal silicate and at least one non-clay latent heat reactant, at least one solar-heat reflective pigment; and at least one colorant. Preferably, the at least one solar-heat reflective pigment and the at least one colorant are selected to provide roofing granules having an L* less than 30 and solar reflectance of at least 20 percent. Preferably, the at least one non-clay latent heat reactant is selected from the group consisting of Portland cement, aluminum fluoride, ammonium silicofluoride, alkali metal silicofluorides, and alkaline earth metal silicofluorides. More preferably, the at least one non-clay latent heat reactant comprises Portland cement, aluminum fluoride and at least one alkali metal silicofluoride. Preferably, the at least one alkali metal silicofluoride is sodium silicofluoride. Preferably, the at least one non-clay latent heat reactant comprises from about 3 to 15 weight percent of the coating composition of aluminum fluoride, from about 0.5 to 5 weight percent of the coating composition of sodium silicofluoride, and from about 0.5 to 5 weight percent of the coating composition of Portland cement. More preferably, the at least one non-clay latent heat reactant comprises from about 5 to 11 weight percent of the coating composition of aluminum fluoride, from about 1.5 to 3 weight percent of the coating composition of sodium silicofluoride, and from about 1.5 to 3 weight percent of the coating composition of Portland cement. Preferably, the metal silicate is selected from the group consisting of ammonium silicate, sodium silicate, potassium silicate and lithium silicate.

Preferably, the at least one solar reflective pigment is selected from the group consisting of solar reflective pigments having L* less than 30 and a solar reflectance of at least 20 percent. In one embodiment, the roofing granules of the present invention comprise at least two coating layers formed from the silicate coating composition. It is preferred that the at least one solar reflective pigment comprises from about 1 percent by weight to about 60 percent by weight of the coating composition in which it is dispersed. Preferably, the coating composition comprises from about 2 percent by weight of the base particles to about 20 percent by weight of the base particles. More preferably, the coating composition comprises from about 4 percent by weight of the base particles to about 10 percent by weight of the base particles.

In yet another aspect, the present invention provides roofing shingles comprising dark colored, solar reflective roofing granules according to the present invention.

In another aspect, the present invention provides a method of making roofing granules. This method comprises providing inert base particles, coating the inert base particles with a coating composition according to the present invention to form at least one coating layer on the inert base particles, and curing the coating composition at an elevated temperature less than the glass sintering temperature of silica. Preferably, the elevated temperature is greater than the dehydration temperature of the components of the coating composition. Preferably, the coating composition is cured between about 300 degrees F. (149 degrees C.) and 1100 degrees F. (593 degrees C.). More preferably, the coating composition is cured between about 500 degrees F. (260 degrees C.) and 1000 degrees F. (538 degrees C.). Preferably, at least two coating layers are formed in preparing the roofing granules.

The process of the present invention produces colored infrared-reflective roofing granules that have a higher solar heat reflectance than colored roofing granules prepared using conventional metal oxide colorants, which typically have a solar heat reflectance of from about 12 percent to about 20 percent. Thus, it is preferred that the colored infrared-reflective roofing granules of the present invention have a solar heat reflectance greater than about 20 percent. It is especially preferred that the colored infrared-reflective roofing granules according to the present invention have a solar heat reflectance of at least about 25 percent, and that bituminous roofing products, such as asphaltic roofing shingles, made with such colored infrared-reflective roofing granules have a solar heat reflectance of at least about 20 percent, more preferably at least about 25 percent, with a solar heat reflectance of at least about 30 percent being especially preferred.

The solar-reflective granules of the present invention can be prepared by pre-mixing the components of the infrared-reflective coating, namely the binder, pigment(s), and optional additives to a slurry consistency, followed by uniform mixing with the base particles, such as mixing in a rotary tumbler, to achieve a uniform coating on the base particles. The weight of the solar reflective coating composition is preferably from about 2% by weight to about 20% of the weight of the base particles, more preferably from about 4% by weight to about 10% by weight of the base particles. After the mixing, the coated granules can be dried in a rotary drum or fluidized bed with suitable heat to cure the infrared-reflective coating. Alternatively, the base particles can be spray-coated by the pre-mixed solar reflective coating composition in a rotary drum to achieve uniform coverage, followed by drying to achieve a durable solar reflective coating.

After the preparation of the granules to reach desirable colors, particularly in the mid to deep tone colors, the granules can then be deposited onto the asphalt shingle surface during the shingle manufacturing to enhance the solar heat reflectance of the final product. The present invention also provides a process for producing solar reflective roofing shingles, as well as the shingles themselves. This process comprises producing solar reflective roofing granules using the process of this invention, and adhering the granules to a shingle stock material.

The dark colored, solar reflective roofing granules prepared according to the process of the present invention can be employed in the manufacture of solar reflective roofing products, such as solar reflective asphalt shingles and roll goods, including bituminous membrane roll goods. The dark colored, solar reflective granules of the present invention can be mixed with conventional roofing granules, and the granule mixture can be embedded in the surface of bituminous roofing products using conventional methods. Alternatively, the colored, solar reflective granules of the present invention can be substituted for conventional roofing granules in manufacture of bituminous roofing products, such as asphalt roofing shingles, to provide those roofing products with solar reflectance.

DETAILED DESCRIPTION

The present invention provides coating compositions based upon metal-silicate binders and pigment combinations for producing novel roofing granules having a luminance $L^*$ less than 30 and solar reflectance at least 20 percent.

As used in the present specification and claims, $L^*$, $a^*$ and $b^*$ refer to the parameters of the CIELAB color system. As used in the present specification and claims, "colored" means having an $L^*$ value of less than 85, preferably less than 55, even more preferably less than 45, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones. As using in the present specification and claims, "dark color" means a color having an $L^*$ value less than about 30. As used in the present specification and claims, "solar reflective," and "solar heat-reflective" refer to reflectance in the near infrared range (700 to 2500 nm) of the electromagnetic spectrum, and "high solar reflectance" means having an average reflectance of at least about 70 percent over the near infrared range (700 to 2500 nm) of the electromagnetic spectrum. As used in the present specification as claims, "solar reflective functional pigment" denotes a pigment selected from the group consisting of light-interference platelet pigments including mica, light-interference platelet pigments including titanium dioxide, mirrorized silica pigments based upon metal-doped silica, metal flake pigments, metal oxide coated flake pigments, and alumina. As used in the present specification and claims, "granule coloring pigment" denotes a conventional metal oxide-type pigment employed to color roofing granules.

The coating compositions of the present invention can be achieved by adding solar-reflective pigments to metal silicate binders and rendering the metal silicate binder insoluble using non-clay latent heat reactants. Such latent heat reactants for metal-silicate binders are known to exist in coating industry, for example (and included herein as reference), U.S. Pat. No. 4,717,614 teaches the art of preparing metal-silicate coatings using multivalent metal ions. However, the resultant coatings do not have the necessary outdoor long term durability for roofing applications and oftentimes can cure too fast without sufficient working time for the coating composition to be pumped and applied onto the mineral rocks in a roofing granule plant setting.

In the present invention, fluorinated aluminum compounds having certain solubility in metal-silicate solutions and Portland cement can be used to insolubilize the silicate coating at temperatures significantly below the glass sintering temperature of the coating composition. In particular, the combination of aluminum fluoride, sodium silicofluoride, and Portland cement reacted at temperatures above the dehydration temperature of the coating composition and below the sintering temperature of the coating composition can result in a long-term durable silicate coating as confirmed by conventional roofing granule industry testing. To achieve a dark color ($L^*$ less than 30) and high solar reflectance, infrared-reflective pigments that are specially engineered to reflect solar radiation in the near-infrared spectrum can be dispersed in the coating compositions. These pigments are commercially available from, for example, Ferro Corp., Cleveland, Ohio; or Shepherd Color Company, Cincinnati, Ohio). Also, reflective fillers such as mirrorized silica flakes, metal flakes, or metal oxide coated flakes can be added to the coating compositions. Further, plural coating layers formed from coating compositions having different color pigments dispersed in the metal silicate binder can be used to achieve the desirable color space and solar reflectance. Further, biocides, particles with photo-catalytic effects, or other functional additives can be dispersed in the coating composition to incorporate further functionalities. The roofing granule coating compositions of the present invention can be prepared through traditional methods, such as those disclosed in U.S. Pat. Nos. 2,378,927, 2,695,851, and 2,981,636, each incorporated herein by reference.

The coating binder employed in the process of the present invention to form the coating composition is preferably formed from a mixture of an alkali metal silicate, such as aqueous sodium silicate, and at least one non-clay latent heat reactant. As used in the present specification and claims, by "latent heat reactant" is meant a material that chemically reacts with a metal silicate at a temperature less than the glass sintering temperature of the coating composition to form an insoluble material.

When an aqueous solution of a metal silicate, such as an aqueous solution of an alkali metal silicate such as water glass is employed, the latent heat reactant is preferably selected to react chemically with the metal silicate at a temperature greater than the dehydration temperature of the coating composition, but which is less than the glass sintering temperature of the coating composition.

The metal silicate binder employed in the coating compositions of the present invention is preferably an aqueous ammonium silicate or aqueous alkali metal silicate, such as, for example, ammonium silicate, sodium silicate, potassium silicate, and lithium silicate. Preferably, the metal silicate employed in the coating compositions of the present invention is aqueous sodium silicate (water glass). The composition of aqueous sodium silicate is typically characterized by the weight ratio of silicon dioxide to sodium oxide. Preferably, the aqueous sodium silicate employed in the coating compositions of the present invention have a weight ratio of silicon dioxide to sodium oxide of from about 3.25:1 to 2:1, and a total solids content of from about 38 percent by weight to about 42 percent by weight.

The coating compositions of the present invention preferably comprise at least one non-clay latent heat reactant. Examples of non-clay latent heat reactant that can be employed in preparing the coating compositions of the present invention include fluoride compounds such as aluminum fluoride, gallium fluoride, indium fluoride, sodium fluoride, potassium fluoride, lithium fluoride, sodium silicofluoride, ammonium silicofluoride, potassium silicofluoride, lithium silicofluoride, barium silicofluoride, zinc silicofluoride, and magnesium silicofluoride, as well as fluoride containing minerals such as cryolite. Further examples of non-clay latent heat reactants include hydraulic cements such as Portland cements, such as Type I Portland cement and Type III Portland cement, blended Portland cements, such as blends of Portland cement with blast furnace slag, blends of Portland cement with pozzolanic materials such as fly ash, expansive Portland cements such as Types K, M, S and O cements, rapid setting and rapid hardening Portland cements such as regulated set cement, very high early strength cement, high iron cement, and ultra high early strength cement, low-tricalcium aluminate cements such as API class A, C, D, E and F cements, calcium aluminate cements, as well as Portland cement constituents including tricalcium silicate, beta-dicalcium silicate, alite and belite.

Preferably, the at least one non-clay latent heat reactant comprises aluminum fluoride, an alkali metal silicofluoride, and Portland cement. Preferably, the at least one non-clay latent heat reactant comprises from about 3 to 15 weight percent of the coating composition of aluminum fluoride, from about 0.5 to 5 weight percent of the coating composition of sodium silicofluoride, and from about 0.5 to 5 weight percent of the coating composition of Portland cement. More preferably, wherein the at least one non-clay latent heat reactant comprises from about 5 to 11 weight percent of the coating composition of aluminum fluoride, from about 1.5 to 3 weight percent of the coating composition of sodium silicofluoride, and from about 1.5 to 3 weight percent of the coating composition of Portland cement. The proportion of alkali metal silicate to the at least one non-clay latent heat reactant is preferably from about 4:1 to about 1.3:1 parts by weight alkali metal silicate to parts by weight non-clay latent heat reactant, more preferably about 3:1 to about 1.5:1 parts by weight alkali metal silicate to parts by weight at least one non-clay latent heat reactant.

The coating compositions of the present invention also include at least one solar reflective pigment. Examples of solar reflective pigments that can be employed in the coating compositions of the present invention include near infrared-reflective pigments available from the Shepherd Color Company, Cincinnati, Ohio, including Arctic Black 10C909 (chromium green-black), Black 411 (chromium iron oxide), Brown 12 (zinc iron chromite), Brown 8 (iron titanium brown spinel), and Yellow 193 (chrome antimony titanium), as well as near infrared reflective pigments available from the Ferro Corporation (Cincinnati, Ohio), such as Brown 10364, Eclipse Black 10201, IR BRN Black V-780, Forest Green 10241, Blue V-9248, Bright Blue V-9250, Turquoise F05686, Eclipse Black 10202, Eclipse Black 10203, Red V-13810, IR Cobalt Green V-12600, H IR Green V-12650, IR Brown Black V-778, and Brown Black V-799.

The dark colored, solar reflective pigment employed in the coating compositions of the present invention can comprise a solid solution including iron oxide, such as disclosed in U.S. Pat. No. 6,174,360, incorporated herein by reference. The colored solar reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near infrared-absorbing colorant.

Preferably, the at least one solar reflective pigment comprises from about 1 percent by weight to about 60 percent by weight of the coating composition; more preferably from about 5 to 25 percent by weight of the coating composition, and still more preferably from about 7 to 15 percent by weight of the coating composition.

The coating composition can also include at least one solar reflective functional pigment. Examples of solar reflective functional pigments include light-interference platelet pigments, mirrorized silica pigments, metal flake pigments, metal oxide coated flake pigments, and alumina.

Light-interference platelet pigments are known to give rise to various optical effects when incorporated in coatings, including opalescence or "pearlescence." Surprisingly, light-interference platelet pigments have been found to provide or enhance infrared-reflectance of roofing granules coated with compositions including such pigments.

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic $^{TM}$ high chroma crystal effect pigment based upon aluminum oxide platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; and ultra interference pigments based on titanium dioxide and mica.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

Aluminum oxide, preferably in powdered form, can be used as solar-reflective additive in the color coating formulation to improve the solar reflectance of colored roofing granules without affecting the color. The aluminum oxide should have particle size less than U.S. # 40 mesh (425 micrometer), preferably between 0.1 micrometer and 5 micrometer. More preferably, the particle size is between 0.3 micrometer and 2 micrometer. The alumina should have percentage aluminum oxide >90%, more preferably >95%.

Examples of metal flake pigments include aluminum flake pigments, iron flake pigments, iron-aluminum alloy flake pigments, copper flake pigments, brass flake pigments, titanium flake pigments, iron-cobalt-aluminum alloy flake pigments, stainless steel flake pigments, chromium flake pigments, nickel flake pigments, and nickel alloy flake pigments. Examples of metal oxide coated flake pigments are disclosed, for example, in U.S. Pat. No. 6,589,331.

The coating compositions of the present invention can include conventional coatings pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880.

The coating composition of the present invention is applied to base mineral particles to provide a layer of the coating composition on the base particle. The coating composition is then cured at an elevated temperature, preferably at a temperature above the dehydration temperature of the coating composition but less than the sintering temperature of the coating composition to provide an insoluble coating layer on the base particle. Such a coating process can be repeated to form multiple coatings to further enhance the color and solar reflection.

Thus, a second, third or more layers of pigmented coating can be applied in like manner. The second, third, or further layers can be formed from a coating composition which has the same composition as the coating composition employed to form the initial layer. In addition, the composition of the coating composition of the second, third, or further layers can differ from the composition of coating composition used for the initial layer. For example, the pigment composition of the second layer can differ from the pigment composition of the first layer. For example, the pigment composition of the first layer and the second layer can be selected to provide desired values of color space coordinates (hue, chroma, and lightness) and solar reflectance for each layer and for the resulting multi-layer coating.

Preferably, the solar reflective coating is provided in a thickness effective to render the coating opaque to infrared radiation, such as a coating thickness of at least about 100 micrometers. However, advantageous properties of the present invention can be realized with significantly lower coating thicknesses, such as at a coating thickness of from about 2 micrometers to about 25 micrometers including at a coating thickness of about 5 micrometer. Preferably, when plural coating layers are employed, each coating layer has a thickness of at least about 2 micrometers.

The solar heat reflectance properties of the solar heat-reflective roofing granules of the present invention are determined by a number of factors, including the type and concentration of the solar reflective pigment(s) used in the solar heat-reflective coating composition, whether multiple coating layers are provided, and if so, the type and concentration of the solar reflective pigment employed in each coating layer, the nature of the binder(s) used in for the solar heat-reflective coating and the base coating, the number of coats of solar heat-reflective coating employed, the thickness of the solar reflective coating layers, and the size and shape of the base particles.

Infrared-reflective coating compositions according to the present invention can also include supplementary pigments to space infrared-reflecting pigments, to reduce absorption by multiple-reflection. Examples of such "spacing" pigments include amorphous silicic acid having a high surface area and produced by flame hydrolysis or precipitation, such as Aerosil TT600 supplied by Degussa, as disclosed in U.S. Pat. No. 5,962,143, incorporated herein by reference.

The coating composition of the present invention can also include other types of functional additives, such as additive to provide resistance to algae growth. Examples of suitable algae growth inhibitors are disclosed, for example, in U.S.

Patent Application Publications Nos. 2004/0255548 A1 and 2004/0258835 A1, each incorporated herein by reference.

It is preferred that the coating composition comprises from about 2 percent by weight of the base particles to about 20 percent by weight of the base particles. More preferably, the coating composition comprises from about 4 percent by weight of the base particles to about 10 percent by weight of the base particles.

Suitable inert base particles, for example, mineral particles with size passing U.S. # 8 mesh and retaining on U.S. # 70 mesh, can be coated with one or more layers of coating compositions according to the present invention to reach desirable colors and solar reflectance to obtain a durable coating.

The inert base particles employed in the process of the present invention are preferably chemically inert materials, such as inert mineral particles. The mineral particles, which can be produced by a series of quarrying, crushing, and screening operations, are generally intermediate between sand and gravel in size (that is, between about #8 U.S. mesh and #70 U.S. mesh), and preferably have an average particle size of from about 0.2 mm to about 3 mm, and more preferably from about 0.4 mm to about 2.4 mm.

In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured or recycled manufactured materials such as crushed bricks, concrete, porcelain, fire clay, and the like.

In one set of presently preferred embodiments, the inert base particles comprise particles having a generally plate-like geometry. Examples of generally plate-like particles include mica and flaky slate. Colored roofing granules having a generally plate-like geometry have been found to provide greater surface coverage when used to prepare bituminous roofing products, when compared with conventional "cubical" roofing granules, as shown in Table A below. Granule surface coverage is measured using image analysis software, namely, Image-Pro Plus from Media Cybernetics, Inc., Silver Spring, Md. 20910. The shingle surface area is recorded in a black and white image using a CCD camera fitted to a microscope. The image is then separated into an asphalt coating portion and a granule covering portion using the threshold method in gray scale. The amount of granule coverage is then calculated by the image analysis software based upon the number of pixels with gray scale above the threshold level divided by the total number of pixels in the image.

TABLE A

| Sample | Color | Granule Type | Surface Coverage % |
| --- | --- | --- | --- |
| A | White | cubical | 86.0 |
| B | Wood Blend | cubical | 86.6 |
| C | Natural | flaky slate | 91.6 |
| D | Natural | flaky slate | 92.1 |
| E | Natural | flaky slate | 92.9 |
| F | Natural | flaky slate | 91.8 |

The process of the present invention for producing solar reflective roofing granules comprises several steps. In one step of the present process, a coating composition according to the present invention is prepared by mixing a suitable metal silicate such as aqueous sodium silicate with the at least one non-clay latent heat reactant, such as a mixture of aluminum fluoride, sodium silicofluoride, and Type I Portland cement, and at least one suitable solar reflective pigment, preferably a solar reflective pigment selected to provide roofing granules having L* less than 30 and a solar reflectance of at least 20 percent, such as Ferro Eclipse® Black 10202. In another step of the process of producing solar reflective roofing granules according to the present invention, suitable base particles are provided. These can be suitably sized, chemically inert, mineral particles. The base particles are then coated using the coating composition of the present invention to form a coating layer on the base particles. The coating composition is dried at low temperature, such as by drying in a fluidized bed drier. Next, the coating composition is cured at an elevated temperature, preferably greater than the dehydration temperature of the coating composition, but less than the sintering temperature of the coating composition to form a hard, weather-resistant non-porous coating layer on the base particles. A second layer, and a third and further layers, can be applied in like manner. Preferably, the coating composition forms a single layer having, or plural layers collectively having, sufficient thickness to provide good hiding and opacity, such as a thickness of from about 5 micrometers to about 50 micrometers.

Figure 1:
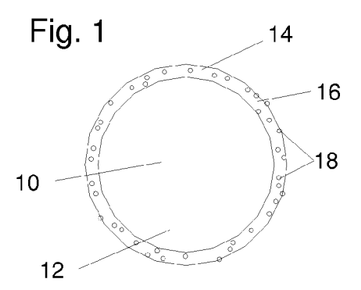
FIG. 1 is a schematic representation of a dark colored roofing granule according a first embodiment of the present invention.

Referring now to the figures in which like reference numerals represent like element in each of the several views, there is shown in FIG. 1, a schematic illustration of the structure of a dark colored solar reflective roofing granule 10 according to a presently preferred first embodiment of the present invention. The colored infrared-reflective roofing granule 10 includes a base particle 12 coated with a cured coating composition 14 comprising a coating binder 16 and at least one solar reflective pigment 18. The cured coating composition 14 is prepared by heat treatment of a coating composition according to the present invention, wherein the coating binder 16 is prepared from a mixture including sodium silicate, aluminum fluoride, sodium silicofluoride, and Portland cement. Preferably, in the dark colored, solar reflective roofing granules 10, the solar reflective pigment 18 comprises from about 1 percent by weight to about 60 percent by weight of the coating composition 14. Preferably, the cured coating composition 14 comprises from about 2 percent by weight of the base particles 12 to about 20 percent by weight of the base particles 12. More preferably, the cured coating composition 14 comprises from about 4 percent by weight of the base particles 12 to about 10 percent by weight of the base particles 12. Optionally, the coating composition 14 can include at least one coloring material selected from the group consisting of granule coloring pigments and algaecides.

Thus, in this first embodiment of dark colored solar reflecting roofing granules 10 of the present invention, the solar reflectance and the color of the dark colored roofing granules 10 are attributable to the colored, solar reflective pigment 18.

Figure 2:
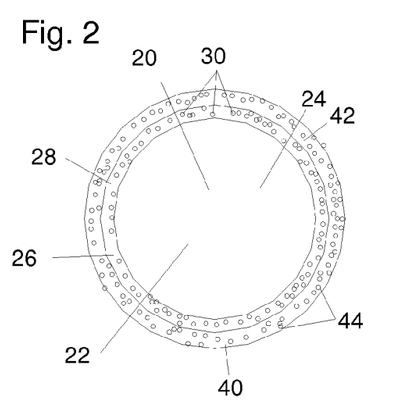
FIG. 2 is a schematic representation of a dark colored roofing granule according a second embodiment of the present invention.

FIG. 2 is a schematic illustration of the structure of a dark colored solar reflective roofing granule 20 according to a presently preferred second embodiment of the present invention. In this embodiment, roofing granule 20 includes a base particle 22 comprising a mineral particle 24 coated with a cured base coating composition 26 according to the present invention including a base particle binder 28, and at least one solar reflective pigment 30 to form an initial coating layer. It is preferred that the at least one solar reflective pigment 30 comprises from about 5 percent by weight to about 60 percent by weight of the base coating composition 26, and more preferred that the at least one solar reflective pigment 30 comprises from about 30 percent by weight to about 40 percent by weight of the base coating composition 26. In this embodiment, the base coating composition 26 preferably comprises from about 1 percent by weight of the inert mineral particles 22 to about 20 percent by weight of the inert mineral particles 24, and more preferably, from about 4 percent by weight of the base particles to about 10 percent by weight of the inert mineral particles. The base particle binder 28 preferably an alkali metal silicate and at least one non-clay latent heat reactant, preferably a mixture consisting of aluminum fluoride, sodium silicofluoride, and Portland cement. The dark colored solar reflective roofing granules 20 of this second embodiment include a second, cured coating composition 40, comprising a coating binder 42, and at least one colored, solar reflective pigment 44. In this embodiment, the composition of the second coating composition 40 is the same as the first coating composition 26. The cured second coating composition 40 forms a second layer of identical composition to the cured coating composition 26 forming the initial coating layer on the mineral particle 24.

In this second embodiment of colored roofing granules 20 of the present invention, both the color and the solar reflectance of the colored roofing granules 30 are attributable to both the solar reflective pigment 30 in the inner layer of the cured base coating composition 26, and the identical solar reflective pigment 44 in the outer layer of the cured coating composition 40. Adding the second coating layer increases the depth of the color and the solar reflectance of the roofing granules. Optionally, a third layer of the same coating composition can be applied to further enhance the depth of color and solar reflectance of the roofing granules 20 (not shown).

Figure 3:
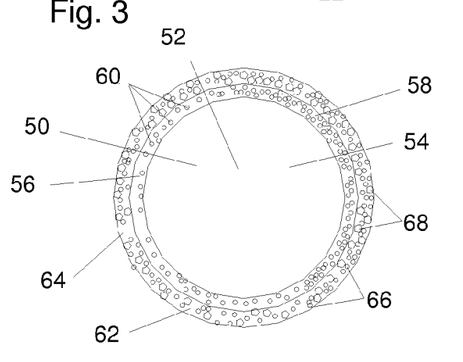
FIG. 3 is a schematic representation of a dark colored roofing granule according a third embodiment of the present invention.

FIG. 3 is a schematic illustration of the structure of a colored solar reflective roofing granule 50 according to a presently preferred third embodiment of the present invention. In this embodiment, the dark colored solar reflective roofing granules 50 comprise base particles 52 comprising inert mineral particles 54 coated with a cured first coating composition 56 according to the present invention including a first or base particle binder 58 and at least one solar reflective pigment 60 to form a first or inner layer on the mineral particles 54, and the base particles 52 are coated with a cured second coating composition 62 according to the present invention including a second or outer coating binder 64, and at least one solar reflective pigment 66 and at least one solar reflective functional pigment 68 to form a second or outer layer on the mineral particles 54. The at least one solar reflective pigment 60 in the inner layer formed by the cured first coating composition 56 differs from the at least one solar reflective pigment 66 in the outer layer formed by the cured second coating composition 62 with respect to color space coordinates.

Preferably, in the colored infrared-reflective roofing granules 50 the at least one solar reflective pigment 66 comprises from about 1 percent by weight to about 60 percent by weight of the cured second coating composition 62. In the colored infrared-reflective roofing granules 50 of the third embodiment, the second coating composition 62 preferably further comprise at least one solar reflective functional pigment 68 selected from the group consisting of mirrorized silica flake pigments, metal flake pigments, and metal oxide coated flake pigments, and the at least one solar reflective functional pigment 68 preferably comprises from about 1 percent by weight to about 60 percent by weight of the second coating composition 62. In this third embodiment, the second coating composition 62 comprises from about 2 percent by weight of the base particles 52 to about 20 percent by weight of the base particles 52, more preferably, from about 4 percent by weight of the base particles 52 to about 10 percent by weight of the base particles 52. In this third embodiment, the first or base coating composition 56 preferably comprises from about 1 percent by weight of the inert mineral particles 54 to about 20 percent by weight of the inert mineral particles 54. In this third embodiment, both the base particle binder 58 and the second or outer coating binder 64 are clay-free coating compositions according to the present invention. Alternatively, one of the binders 58, 64 can comprise a conventional roofing granule coating binder comprising an aluminosilicate material and an alkali metal silicate, where the aluminosilicate material is a clay such as kaolin.

Thus, in this third embodiment of dark colored solar reflective roofing granules 50 according to the present invention, the solar reflectance of the colored roofing granules 50 is attributable to both of the different solar reflective pigments 60, 66 in the inner layer and outer layers form by the first and second coating compositions 56, 62, as well as to the solar reflective functional pigment 68 in the outer layer formed by the cured second coating composition 62. Similarly, the color of the granules 50 of this third embodiment is a function of all three pigments 60, 66, 68 dispersed in the first and second coating compositions 56, 62. The present invention provides mineral surfaced asphalt shingles with L* less than 55, and more preferably less than 30, and solar reflectance greater than 20 percent. Preferably, asphalt shingles according to the present invention comprise colored, solar reflective granules according to the present invention, and optionally, conventional colored roofing granules. Conventional colored roofing granules and infrared-reflective roofing granules can be blended in combinations to generate desirable colors. The blend of granules is then directly applied on to hot asphalt coating to form the shingle. Examples of granule deposition apparatus that can be employed to manufacture asphalt shingles according to the present invention are provided, for example, in U.S. Pat. Nos. 4,583,486, 5,795,389, and 6,610,147, and U.S. Patent Application Publication U.S. 2002/0092596.

The process of the present invention advantageously permits the solar reflectance of the shingles employing the solar-reflective granules to be tailored to achieve specific color effects.

The colored, infrared-reflective granules prepared according to the process of the present invention can be employed in the manufacture of infrared-reflective roofing products, such as infrared-reflective asphalt shingles, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The colored, infrared-reflective granules of the present invention can be mixed with conventional roofing granules, and the granule mixture can be embedded in the surface of such bituminous roofing products using conventional methods. Alternatively, the colored, infrared-reflective granules of the present invention can be substituted for conventional roofing granules in manufacture of bituminous roofing products to provide those roofing products with solar reflectance.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand.

Roofing granules are then distributed over selected portions of the top of the sheet, and the bituminous material serves as an adhesive to bind the roofing granules to the sheet when the bituminous material has cooled.

The sheet can then be cut into conventional shingle sizes and shapes (such as one foot by three feet rectangles), slots can be cut in the shingles to provide a plurality of "tabs" for ease of installation and aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow. In the examples, granule color measurements were made using the Roofing Granules Color Measurement Procedure from the Asphalt Roofing Manufacturers Association (ARMA) Granule Test Procedures Manual, ARMA Form No. 441-REG-96.

Example 1

Inert mineral rocks with sizes between U.S. # 10 U.S. mesh and # 40 U.S. mesh (commercially available from Certain-Teed Corp., Piedmont, Mo.) are coated by coating comprising 9.5 g sodium silicate binder (Grade 40 from, Occidental Chemical Company, Dallas, Tex.), aluminum fluoride (available from Aldrich Chemical), sodium silicofluoride (available from Aldrich Chemical), kaolin clay (available from Unimin Corp.), and Portland cement as latent heat reactants in various combinations. The details of the compositions are listed in Table 1. The coating composition is first mixed in a beaker using a propeller mixer at 300 rpm and then is blended with 25.0 g of the mineral particles until a uniform mixture is achieved. The coated granules are then spread out on wax paper and dried in air. The granules are then placed in a crucible and heat treated in a temperature-controlled furnace set at 260 degrees C. (500 degrees F.) or 538 degrees C. (1000 degrees F.) for 3 hours. The granules are then cooled to room temperature, and their surface alkalinity is measured by boiling in water for five minutes followed by titration with 0.05 N HCl (ARMA Granule Test Method #7). The results are shown in Table 1. The use of aluminum fluoride, sodium silicofluoride, and Portland cement in the sodium silicate binder cured at a temperature of 538 degrees C. (1000 degrees F.) results in much lower alkalinity number as compared to the control case. Also, several combinations of the ingredient with no clay result in a coating with a very low alkalinity number, which is an indicative of complete insolubilization of the binder and hence long-term durability.

TABLE 1

| Run No. | Kaolin Clay (g) | $AlF_3$ (g) | $Na_2SiF_8$ (g) | Portland Cement (g) | Water (g) | Cure Temp. (deg. F.) | Alkalinity Number |
|---|---|---|---|---|---|---|---|
| 1 | 0 | 0.705 | 0.207 | 0.193 | 1.75 | 500 | 38.5 |
| 2 | 0 | 0.705 | 0.414 | 0.193 | 1.75 | 500 | 30.4 |
| 3 | 0 | 0.705 | 0.207 | 0.385 | 1.75 | 500 | 36.5 |
| 4 | 3 | 0.705 | 0.207 | 0.193 | 3.75 | 500 | 28.5 |
| 5 | 0 | 1.41 | 0.207 | 0.193 | 1.75 | 500 | 35.9 |
| 6 | 0 | 1.41 | 0.414 | 0.193 | 1.75 | 500 | 27.75 |
| 7 | 0 | 1.41 | 0.207 | 0.385 | 1.75 | 500 | 33.5 |
| 8 | 3 | 1.41 | 0.193 | 0.193 | 3.75 | 500 | 27.8 |
| 9 | 0 | 0.705 | 0.414 | 0.385 | 1.75 | 500 | 30.3 |
| 10 | 3 | 0.705 | 0.414 | 0.193 | 3.75 | 500 | 25.8 |
| 11 | 3 | 0.705 | 0.207 | 0.385 | 3.75 | 500 | 30.7 |
| 12 | 3 | 0.705 | 0.414 | 0.385 | 3.75 | 500 | 20.6 |
| 13 | 3 | 1.41 | 0.414 | 0.385 | 3.75 | 500 | 20.75 |
| 14 | 0 | 1.41 | 0.414 | 0.385 | 1.75 | 500 | 28.6 |
| 15 | 3 | 1.41 | 0.414 | 0.193 | 3.75 | 500 | 25.8 |
| 16 | 3 | 1.41 | 0.207 | 0.385 | 3.75 | 500 | 25.6 |
| 17 | 0 | 0.705 | 0.207 | 0.193 | 1.75 | 1000 | 10.05 |
| 18 | 0 | 0.705 | 0.414 | 0.193 | 1.75 | 1000 | 7.25 |
| 19 | 0 | 0.705 | 0.207 | 0.385 | 1.75 | 1000 | 8.9 |
| 20 | 3 | 0.705 | 0.207 | 0.193 | 3.75 | 1000 | NA* |
| 21 | 0 | 1.41 | 0.207 | 0.193 | 1.75 | 1000 | 4.9 |
| 22 | 0 | 1.41 | 0.414 | 0.193 | 1.75 | 1000 | 2.9 |
| 23 | 0 | 1.41 | 0.207 | 0.385 | 1.75 | 1000 | 1.5 |

TABLE 1-continued

| Run No. | Kaolin Clay (g) | AlF$_3$ (g) | Na$_2$SiF$_8$ (g) | Portland Cement (g) | Water (g) | Cure Temp. (deg. F.) | Alkalinity Number |
|---|---|---|---|---|---|---|---|
| 24 | 3 | 1.41  | 0.207 | 0.193 | 3.75 | 1000 | NA* |
| 25 | 0 | 0.705 | 0.414 | 0.385 | 1.75 | 1000 | 4.3 |
| 26 | 3 | 0.705 | 0.414 | 0.193 | 3.75 | 1000 | NA* |
| 27 | 3 | 0.705 | 0.207 | 0.385 | 3.75 | 1000 | NA* |
| 28 | 3 | 0.705 | 0.414 | 0.385 | 3.75 | 1000 | NA* |
| 29 | 3 | 1.41  | 0.414 | 0.385 | 3.75 | 1000 | NA* |
| 30 | 0 | 1.41  | 0.414 | 0.385 | 1.75 | 1000 | 2.45 |
| 31 | 3 | 1.41  | 0.414 | 0.193 | 3.75 | 1000 | NA* |
| 32 | 3 | 1.41  | 0.207 | 0.385 | 3.75 | 1000 | NA* |

Examples 2-4

Black colored roofing granules were prepared by coating 1000 g of inert mineral rocks suitable for shingle applications (commercially available from CertainTeed Corp., Piedmont, Mo.), and a silicate coating composition comprising 37.5 g of sodium silicate (grade 40, Occidental Chemical Co., Dallas, Tex.), 2.812 g of aluminum fluoride, 0.814 g of sodium silicofluoride, 0.75 g of Portland cement, 0.6 g of green pigment (RD-1563 from Ferro Corp., Cleveland, Ohio), 0.46 g of ultramarine blue pigment (FP4O, also from Ferro Corp.), 4.4 g of black-pigment (10202 black, also from Ferro Corp.), and 7 g of water. The coating composition was first mixed in a beaker with a mixer at 300 rpm and was then blended with the mineral particles in a plastic bottle until a uniform mixture was attained. The coated granules were then dried by a fluidized bed dryer, and were then heat treated at 496 degrees C. (925 degrees F.) in a rotary dryer to cure the coating composition. The resultant granules have a very dark color with L* at 26.55 and improved solar reflectance. Repeating the coating process for two additional layers of coating provided a color close to the typical dark black roofing granule known as #51 black (Available from 3M Corp., Corona, Calif.) but having four times higher solar reflectance. The results are listed in Table 2.

TABLE 2

|  | L* | a* | b* | Solar reflectance |
|---|---|---|---|---|
| Control (#51 black granule) | 24.92 | −0.12 | −0.89 | 0.04 |
| Example 2 (one coat) | 26.55 | 2.01 | 2.63 | 0.14 |
| Example 3 (two coats) | 25.43 | 0.81 | 1.18 | 0.17 |
| Example 4 (three coats) | 24.14 | 0.42 | 0.84 | 0.20 |

Various modifications can be made in the details of the various embodiments of the processes, compositions and articles of the present invention, all within the scope and spirit of the invention and defined by the appended claims.

The invention claimed is:

1. A coating composition comprising:
    a metal silicate;
    at least one non-clay latent heat reactant, the at least one non-clay latent heat reactant comprising from about 3 to 15 weight percent of the coating composition of aluminum fluoride, from about 0.5 to 5 weight percent of the coating composition of sodium silicofluoride, and from about 0.5 to 5 weight percent of the coating composition of Portland cement; and
    at least one pigment having high solar reflectance, wherein the at least one pigment is selected from the group consisting of solar reflective pigments having an L* less than 30 and a solar reflectance of at least 20 percent.

2. A coating composition according to claim 1 wherein the at least one non-clay latent heat reactant comprise from about 5 to 11 weight percent of the coating composition of aluminum fluoride, from about 1.5 to 3 weight percent of the coating composition of sodium silicofluoride, and from about 1.5 to 3 weight percent of the coating composition of Portland cement.

3. A coating composition according to claim 1 wherein the metal silicate is selected from the group consisting of ammonium silicate, sodium silicate, potassium silicate and lithium silicate.

4. A substrate coated with the coating composition of claim 1.

5. A coated substrate according to claim 4 wherein the coated substrate has an L* less than about 30 and a solar reflectance of at least about 20 percent.

6. A coated substrate according to claim 5 wherein the coated substrate comprises an architectural material.

7. Dark colored, solar reflective roofing granules, the roofing granules comprising:
    (a) an inert base particle;
    (b) at least one coating layer, the at least one coating layer formed from a silicate coating composition comprising a metal silicate coating binder comprising a metal silicate and at least one non-clay latent heat reactant; and at least one pigment having high solar reflectance;
    the at least one solar reflective pigment being selected to provide roofing granules having an L* less than 30 and solar reflectance of at least 20 percent.

8. Roofing granules according to claim 7 wherein the at least one non-clay latent heat reactant is selected from the group consisting of Portland cement, aluminum fluoride, ammonium silicofluoride, alkali metal silicofluorides, and alkaline earth metal silicofluorides.

9. Roofing granules according to claim 8 wherein the at least one non-clay latent heat reactant comprises Portland cement, aluminum fluoride and at least one alkali metal silicofluoride.

10. Roofing granules according to claim 9 wherein the at least one alkali metal silicofluoride is sodium silicofluoride.

11. Roofing granules according to claim 10 wherein the at least one non-clay latent heat reactant comprises from about 3 to 15 weight percent of the coating composition of aluminum fluoride, from about 0.5 to 5 weight percent of the coating composition of sodium silicofluoride, and from about 0.5 to 5 weight percent of the coating composition of Portland cement.

12. Roofing granules according to claim 11 wherein the at least one non-clay latent heat reactant comprises from about 5 to 11 weight percent of the coating composition of aluminum fluoride, from about 1.5 to 3 weight percent of the coating composition of sodium silicofluoride, and from about 1.5 to 3 weight percent of the coating composition of Portland cement.

13. Roofing granules according to claim 7, the roofing granules comprising at least two coating layers formed from the silicate coating composition.

14. Roofing granules according to claim 7 wherein the metal silicate is selected from the group consisting of ammonium silicate, sodium silicate, potassium silicate and lithium silicate.

15. Roofing granules according to claim 7 wherein the at least one solar reflective pigment is selected from the group consisting of solar reflective pigments having an L* less than 30 and a solar reflectance of least 20 percent.

16. Roofing shingles comprising dark colored, solar reflective roofing granules, each roofing granule comprising:
(a) an inert base particle;
(b) at least one coating layer, the at least one coating layer formed from a coating composition comprising
   a metal silicate coating binder comprising an alkali metal silicate and at least one non-clay latent heat reactant; and
   at least one pigment having high solar reflectance;
the at least one solar reflective pigment being selected to provide roofing granules having an L* less than 30 and solar reflectance of at least 20 percent.

* * * * *